United States Patent [19]

Drossbach

[11] 4,113,818

[45] Sep. 12, 1978

[54] DRAIN PIPE METHOD

[75] Inventor: Hubert Drossbach, Rain Am Lech, Fed. Rep. of Germany

[73] Assignee: Agro-Drip, Incorporated, Hampton, N.H.

[21] Appl. No.: 773,766

[22] Filed: Mar. 2, 1977

[51] Int. Cl.[2] .............................................. B29C 17/10

[52] U.S. Cl. ...................................... 264/154; 405/49; 138/121; 138/122; 264/145; 264/150; 264/173

[58] Field of Search ........................ 138/122, 121, 177; 61/10, 11; 264/145, 154, 95, 90, 99, 89, 150, 173

[56] References Cited

U.S. PATENT DOCUMENTS

| | | | |
|---|---|---|---|
| 3,538,209 | 11/1970 | Hegler | 264/145 |
| 3,559,692 | 2/1971 | Mantelet | 138/121 |
| 4,024,894 | 5/1977 | Drossbach | 138/121 |

*Primary Examiner*—Richard E. Aegerter

[57] ABSTRACT

A drain pipe of corrugated form comprising corrugations of uniform inner diameter having axially in line alternating drain holes and outward protrusions in the corrugation troughs. The drain holes are cut by a stationary knife which engages the troughs of normally formed corrugations but which are set below the level of the protrusions, thus cutting a drain hole only in alternate corrugations. Preferably drain holes and protrusions are also staggered about the circumference of each corrugation trough.

3 Claims, 3 Drawing Figures

DRAIN PIPE METHOD

The invention relates to drain pipes manufactured from plastic, in which a smooth-walled extruded pipe is provided with annular or helicoidal corrugations along a molding-train which follows the extruder and in which water inlet orifices are produced in the corrugation troughs from the inside by means of stationary knives over which the corrugated tube is passed.

Plastic pipes with annular corrugations were initially manufactured for electrical insulating purposes. For the manufacture of such pipes one uses for example a process known from German Pat. No. 1,753,625. In order to use such plastic pipes for drain purposes one encounters the problem of installing water inlet orifices in the tube wall. Various solutions for this problem are known. According to German application No. 1,875,093 it is disclosed how to install the water inlet orifices from the inside. This was evidently considered to be a problem, because in German disclosure document No. 1,459,414 it is assumed that circular knives must be passed through the already manufactured pipe. This document therefore proposes to provide protrusions in the corrugation troughs, and to then cut these protrusions by means of rotating blades, which do not quite extend into the trough bottoms. In the practical application of this idea one is forced to use a nut-like tool which is rotated about the axis of the pipe being formed and which cuts the protrusions with the aid of cutting tools which protrude inward while it is being rotated. The disadvantage of this technique lies in the special drive problem, because the tool must operate at a certain rotation speed depending on the advance velocity of the pipe manufacture, which imposes a maximum limit on the production capacity.

It is also known, however, to provide protrusions on the inside of the drain pipe, that is, on the corrugation crests facing inward, and to slit these open by means of stationary knives. The disadvantage of this technique consists in the need to provide inward profile protrusions on the molds which form the corrugations in the pipe in order to make the protrusions. Since the internal profiles of the mold are made by a turning process, it became necessary to provide the inward-protruding profiles by inserting corresponding mold pieces, which resulted in considerable tooling costs.

It is now the object of the invention to manufacture drain pipes with water inlet orifices located in the corrugation troughs by means of a substantially simpler process, which, on the one hand, avoids the use of rotating tools for slitting the tube wall, and on the other hand permits a continuous process, and finally ensures that the strength of the slitted pipes is not decreased.

Starting with the process mentioned initially, the invention consists in maintaining a constant inside diameter of the corrugations, and creating regions along the inward-protruding corrugation crests, along the line of motion of the stationary knife, which locally project outward so that these particular wall regions cannot be slit by the knives.

Whereas in the prior art (German disclosure document No. 1,459,414) protrusions are made so that they can then be cut open, the present invention teaches the opposite, namely to produce protrusions in order that they be not slit. The formations according to the invention prevent the pipe wall from being cut by the stationary knife in undesired regions.

It is recommended in particular that the outwardly projecting wall regions along the travel of each individual knife are provided at every other corrugation of the pipe. It has also been found advantageous to provide along each single corrugation alternately slitting places and protrusions.

In this manner, neighboring corrugation regions of the drain pipe exhibit only one water inlet orifice. Surprisingly, the number of water inlet orifices per running meter available compared to prior art drain pipes is not decreased, whereas tooling design cost is reduced and the process for cutting water inlet orifices is simplified, without reducing the strength of the drain pipe.

A further object of the present invention is a drain pipe of plastic of annular or helicoidal corrugations and with wart-like protrusions located in the corrugation troughs, in which the essence of the invention consists in that the protrusions have closed walls, and the corrugation troughs are provided with water inlet orifices between the protrusions, in the direction parallel to the pipe axis.

Other objects, features and advantages of this invention will be apparent to those skilled in the art from the following detailed description of a preferred embodiment thereof taken together with the accompanying drawings, in which.

Figure 1:
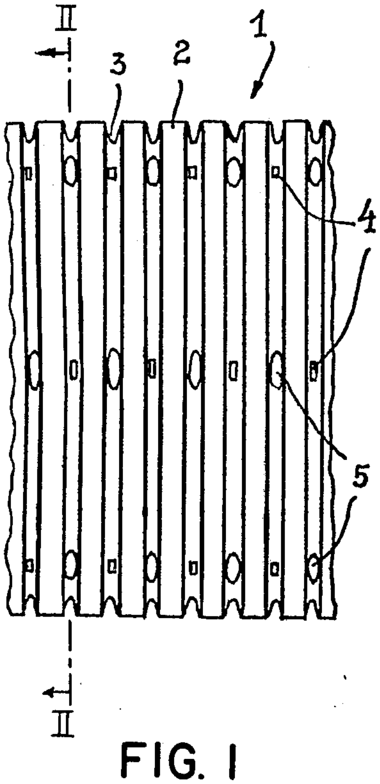
FIG. 1 is a fragmentary side elevation view of a drain pipe according to the invention.

The drain pipe according to FIG. 1 is produced in the customary manner, for example by passing as a smooth-walled pipe from an extruder into a forming device that produces the annular corrugations 2 and the corrugation troughs 3 located between the annular corrugations 2 with the aid of rotating profiling tools.

During formation of the annular corrugations 2 the recoiling wall protrusions 5 are also formed in the corrugation troughs 3, and these appear as convex protrusions in the outside view of the pipe. Between these wall regions 5 there are located, in the exemplary embodiment of FIG. 1, both in the circumferential direction of individual corrugation troughs 3, as well as in the paraxial direction, water inlet orifices 4, which are machined into the corrugation troughs 3. This machining of the water inlet orifices is performed during the shaping process of the drain pipe in a known manner by means of stationary knives over which the extruded pipe is advanced in the axial direction. These stationary knives will thus cut only the corrugation troughs 3 which have been profiled normally in the customary manner. The next corrugation trough to follow, however, exhibits the recoiling wall region protrusion 5 at the position at which the stationary knife would cut its slot, so that the stationary knife fails to make contact with the drain pipe wall in this region.

Figure 2:
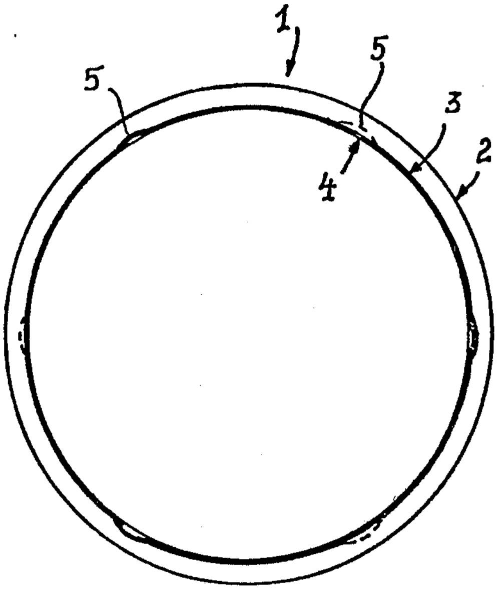
FIG. 2 is a cross-section through a drain pipe along the line II—II in FIG. 1.

It is now possible to arrange several stationary knives along the circumference of the device. In the exemplary embodiment of FIGS. 1 and 2, six such knives are provided, which would thus produce six water inlet orifices 4 in each corrugation trough 3. However, since in the exemplary embodiment three regions are provided with protrusions 5 in each corrugation trough, there will actually be only three water inlet orifices 4 produced in each corrugation trough 3, but these perforations will be staggered with respect to each other from one corrugation trough 3 to the next. In this manner the entire circumference of the drain pipe is used for water distribution without impairing the strength of the drain pipe 1.

Figure 3:
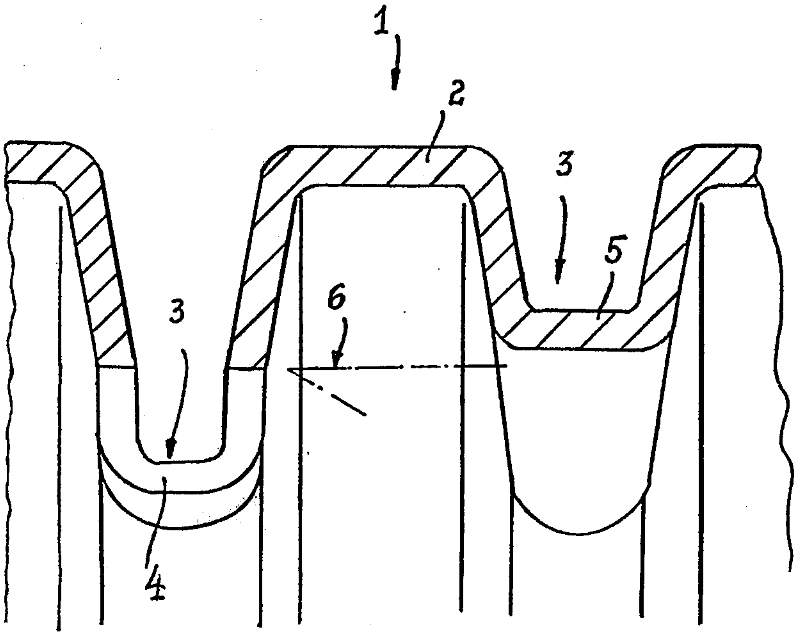
FIG. 3 is an enlarged, fragmentary, longitudinal section through the wall of a drain pipe according to FIG. 1.

In the exemplary embodiment of FIG. 3 it is finally shown that the protrusion 5 is displaced far enough that the action plane 6 of the individual stationary knife will reach only the normally shaped corrugation trough 3, but not the wall protrusion regions 5.

These protrusions 5 can be produced by a simple forming technique by providing the forming mold at the appropriate position with a slight milled spot in the ridge which forms the annular corrugation. The thermoplastic pipe emerging from the extruder is therefore deformed into this milled spot by the action of the internal pressure or by the action of suction from the outside, so that in this region the individual annular corrugation 2 of the drain pipe 1 will not have the normal inside diameter, but will exhibit an outward protrusion as mentioned above. It is thus possible, by suitable correction of the forming tools to determine arbitrarily at which positions and how frequently water inlet orifices are to be produced in the drain pipe.

It is thus shown that numerous possibilities exist for producing the water inlet orifices by a melting process. The invention therefore extends to all variants which operate according to this principle.

What is claimed is:

1. The method of producing corrugated pipe having water inlet orifices in the troughs of said corrugations characterized by forming corrugations of uniform inner diameter in the wall of said pipe and forming outwardly extending protrusions in said troughs along a line extending axially along said pipe by providing a forming mold having corrugations with interruptions corresponding to said protrusions and deforming said pipe into said corrugations and said interruptions, said protrusions spaced along said line in troughs alternating with other troughs having no protrusions along said line, moving said pipe linearly relative to a cutter arranged inwardly of said protrusions and outwardly of said troughs, and cutting said troughs by said relative linear motion of said pipe and cutter to form said orifices in said troughs in line with said protrusions which remain uncut.

2. The method claimed in claim 1 characterized in forming said protrusions along a plurality of axially extending lines in troughs alternating with other troughs having no protrusions along said line, providing a said cutter along each said line and cutting said troughs to form said orifices along each said line.

3. The method claimed in claim 2 further characterized by providing said protrusions along each said line in alternate troughs and forming protrusions at alternate lines about the circumference of said pipe.

* * * * *